(12) United States Patent
Maher et al.

(10) Patent No.: US 9,611,698 B2
(45) Date of Patent: Apr. 4, 2017

(54) HOLE OPENER BEARING ARRANGEMENT

(75) Inventors: John P. Maher, Altoona, IA (US);
Randy R. Runquist, Knoxville, IA (US)

(73) Assignee: Vermeer Manufacturing Company, Pella, IA (US)

( * ) Notice: Subject to any disclaimer, the term of this patent is extended or adjusted under 35 U.S.C. 154(b) by 337 days.

(21) Appl. No.: 14/344,448

(22) PCT Filed: Sep. 14, 2012

(86) PCT No.: PCT/US2012/055507
§ 371 (c)(1),
(2), (4) Date: Mar. 12, 2014

(87) PCT Pub. No.: WO2013/040408
PCT Pub. Date: Mar. 21, 2013

(65) Prior Publication Data
US 2014/0338984 A1 Nov. 20, 2014

Related U.S. Application Data

(60) Provisional application No. 61/535,623, filed on Sep. 16, 2011.

(51) Int. Cl.
| | |
|---|---|
| *E21B 10/34* | (2006.01) |
| *E21B 10/20* | (2006.01) |
| *E21B 10/22* | (2006.01) |
| *E21B 10/24* | (2006.01) |
| *E21B 10/25* | (2006.01) |
| *E21B 10/28* | (2006.01) |
| *B23P 6/00* | (2006.01) |

(52) U.S. Cl.
CPC ............... *E21B 10/34* (2013.01); *B23P 6/00* (2013.01); *E21B 10/20* (2013.01); *E21B 10/22* (2013.01); *E21B 10/24* (2013.01); *E21B 10/25* (2013.01); *E21B 10/28* (2013.01); *Y10T 29/4973* (2015.01); *Y10T 29/49721* (2015.01)

(58) Field of Classification Search
CPC .......... E21B 10/20; E21B 10/22; E21B 10/24; E21B 10/25; E21B 10/28; E21B 10/34
See application file for complete search history.

(56) References Cited

U.S. PATENT DOCUMENTS

| | | | | |
|---|---|---|---|---|
| 1,325,086 A | * | 12/1919 | Godbold ................ | E21B 10/20 175/315 |
| 1,634,318 A | * | 7/1927 | Bull ....................... | E21B 10/24 175/227 |
| 2,519,716 A | * | 8/1950 | Stokes .................... | E21B 10/22 175/370 |
| 2,557,619 A | * | 6/1951 | Swart ..................... | E21B 10/28 175/315 |

(Continued)

OTHER PUBLICATIONS

International Search Report for corresponding International Patent Application No. PCT/US2012/055507 mailed Mar. 18, 2013.

*Primary Examiner* — Jennifer H Gay
(74) *Attorney, Agent, or Firm* — Merchant & Gould P.C.

(57) ABSTRACT

The present disclosure provides a back reamer roller cone that is configured so that the bearings assemblies therein can be relatively easily removed and replaced. Methods of replacing the bearing assemblies in a back reamer are also provided.

19 Claims, 14 Drawing Sheets

(56) References Cited

U.S. PATENT DOCUMENTS

| | | | | |
|---|---|---|---|---|
| 3,551,981 A * | | 1/1971 | Hagar | E21B 10/61 175/340 |
| 3,666,029 A * | | 5/1972 | Dixon | E21B 10/52 175/374 |
| 3,787,101 A | | 1/1974 | Sugden | |
| 3,847,235 A * | | 11/1974 | Goodfellow | E21B 10/22 175/372 |
| 4,161,343 A * | | 7/1979 | Brashear | E21B 10/20 384/96 |
| 4,491,428 A * | | 1/1985 | Burr | E21B 10/22 384/93 |
| 4,508,184 A * | | 4/1985 | Hansen | E21B 10/30 175/346 |
| 4,722,615 A * | | 2/1988 | Bailey | E21B 10/20 175/369 |
| 4,865,137 A * | | 9/1989 | Bailey | E21B 10/20 175/228 |
| 4,895,215 A * | | 1/1990 | Rives | E21B 10/25 175/359 |
| 5,224,560 A * | | 7/1993 | Fernandez | E21B 10/16 175/374 |
| 5,363,930 A * | | 11/1994 | Hern | F16N 9/02 175/228 |
| 5,477,934 A * | | 12/1995 | Strand | E21B 10/24 175/227 |
| 5,487,435 A * | | 1/1996 | Crawley | E21B 10/28 175/363 |
| 5,626,201 A * | | 5/1997 | Friant | E21B 10/12 175/365 |
| 5,839,523 A | | 11/1998 | Brolund | |
| 5,961,185 A | | 10/1999 | Friant et al. | |
| 5,979,574 A | | 11/1999 | Osadchuk | |
| 5,984,024 A | | 11/1999 | Strand | |
| 6,484,819 B1 * | | 11/2002 | Harrison | E21B 7/064 166/66 |
| 6,708,786 B2 * | | 3/2004 | Cariveau | E21B 10/22 175/363 |
| 6,729,418 B2 | | 5/2004 | Slaughter, Jr. et al. | |
| 6,742,608 B2 * | | 6/2004 | Murdoch | E21B 10/20 175/366 |
| 7,243,737 B2 | | 7/2007 | Michael | |
| 7,278,500 B2 | | 10/2007 | Brolund | |
| 7,530,409 B2 * | | 5/2009 | Kennedy | E21B 10/24 175/228 |
| 8,887,833 B2 * | | 11/2014 | Crane | E21B 7/28 175/320 |
| 2002/0166702 A1 * | | 11/2002 | Cariveau | E21B 10/22 175/371 |
| 2004/0065481 A1 * | | 4/2004 | Murdoch | E21B 10/20 175/339 |
| 2005/0252694 A1 * | | 11/2005 | Kennedy | E21B 10/30 175/406 |
| 2006/0060384 A1 | | 3/2006 | Michael | |
| 2010/0252326 A1 | | 10/2010 | Bhome et al. | |
| 2012/0043132 A1 * | | 2/2012 | Crane | E21B 7/28 175/53 |
| 2014/0338979 A1 * | | 11/2014 | Gunsaulis | E21B 10/28 175/57 |
| 2014/0338984 A1 * | | 11/2014 | Maher | E21B 10/20 175/336 |
| 2016/0040482 A1 * | | 2/2016 | Loikkanen | E21B 10/10 175/371 |

* cited by examiner

HOLE OPENER BEARING ARRANGEMENT

This application is a National Stage Application of PCT/US2012/055507, filed Sep. 14, 2012, which claims benefit of U.S. Provisional Patent Application Ser. No. 61/535,623, filed Sep. 16, 2011, and which applications are incorporated herein by reference. To the extent appropriate, a claim of priority is made to each of the above-disclosed applications.

TECHNICAL FIELD

The present disclosure provides a roller cone for a back reamer and related methods.

BACKGROUND

The process known as horizontal directional drilling is utilized to install a variety of underground utilities in a manner that does not disrupt the surface. In use, a drill machine is used to drill a pilot bore that extends beneath the ground surface from an entry hole at the ground surface (i.e., a starting point) to an exit hole at the ground surface (i.e., an ending point). The pilot bore is drilled by rotating and pushing a ground engaging tool (e.g., a drill bit) that is attached to the end of a drill rod. The length of the pilot bore is extended by stringing multiple rods together to form a drill string. The direction of drilling can be controlled (i.e., the drill string can be "steered") by various techniques to control the depth of the pilot bore as well as the location of the exit hole. The location of the drill string, after the pilot bore is completed, represents the desired location of the utility to be installed.

After the pilot bore is drilled, the drill bit is typically removed and a second ground engaging tool installed onto the end of the drill string. This tool is typically known as a back reamer or a hole opener. Its function is to ream/open the drilled bore to a diameter sufficient to allow installation of the utility. To provide a reaming function, the back reamer is typically pulled back through the pilot bore by the drill string as the drill string is withdrawn from the pilot bore. Oftentimes the utility being installed is attached with a swivel located at the end of the back reamer such that the utility is pulled into the reamed bore immediately behind the back reamer. (See FIG. 1.) In this way, the act of withdrawing the drill string will simultaneously result in the installation of the utility.

The type of utilities installed typically includes telecommunications, power, water, natural gas, liquid gas pipelines, potable water pipes and sewers. Due to this large variety of utilities, there is a large variety in the size requirements for the final reamed borehole, and thus a wide range of back reamer sizes is required.

Back reaming can be of the type that includes a plurality of roller cones attached to a tool body. For an example of such a back reaming tool, see U.S. Pat. No. 7,243,737, which is incorporated by reference herein it its entirety. There is a need for improved back reamers that are configured to withstand extreme use conditions and are easily rebuildable.

SUMMARY

The present disclosure provides a back reamer roller cone that is configured so that the bearing assemblies therein can be relatively easily removed and replaced. Methods of replacing the bearing assemblies in a back reamer are also provided.

DETAILED DESCRIPTION OF THE PREFERRED EMBODIMENT

Reference will be made in detail to example embodiments that are illustrated in the accompanying drawings. Wherever possible, the same reference numbers will be used throughout the drawings to refer to the same or alike parts.

Figure 1:
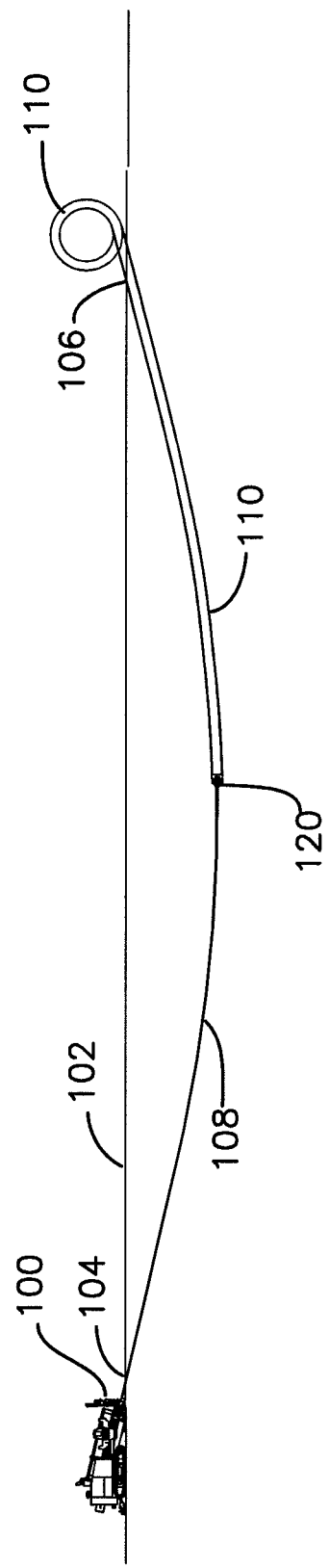
FIG. 1 is a schematic representation of a horizontal directional drilling system in accordance with the principles of the present disclosure.
Figure 2:
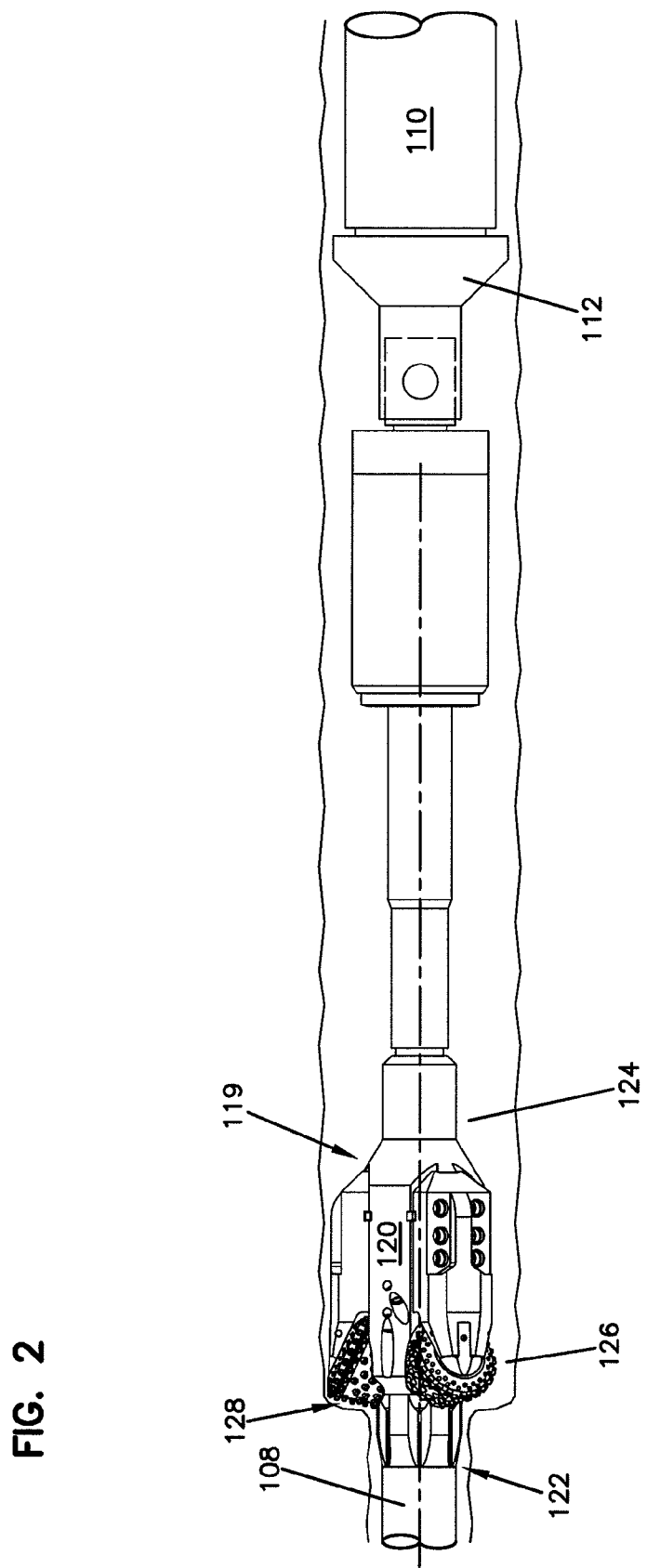
FIG. 2 is an enlarged view of a portion of FIG. 1 showing the back reamer according to the principles of the present disclosure attached to a utility.
Figure 3:
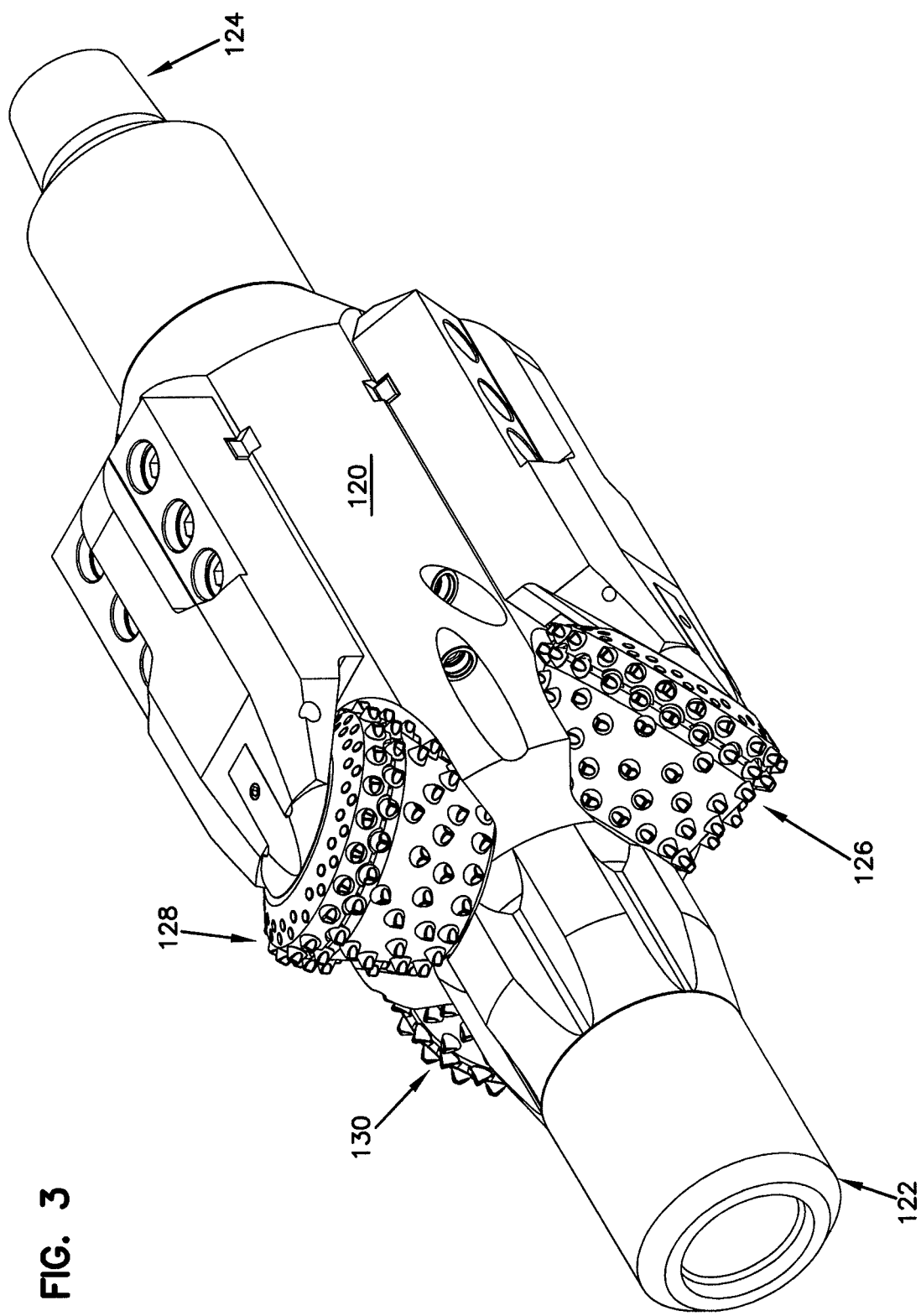
FIG. 3 is a front perspective view of the back reamer of FIG. 2.
Figure 4:
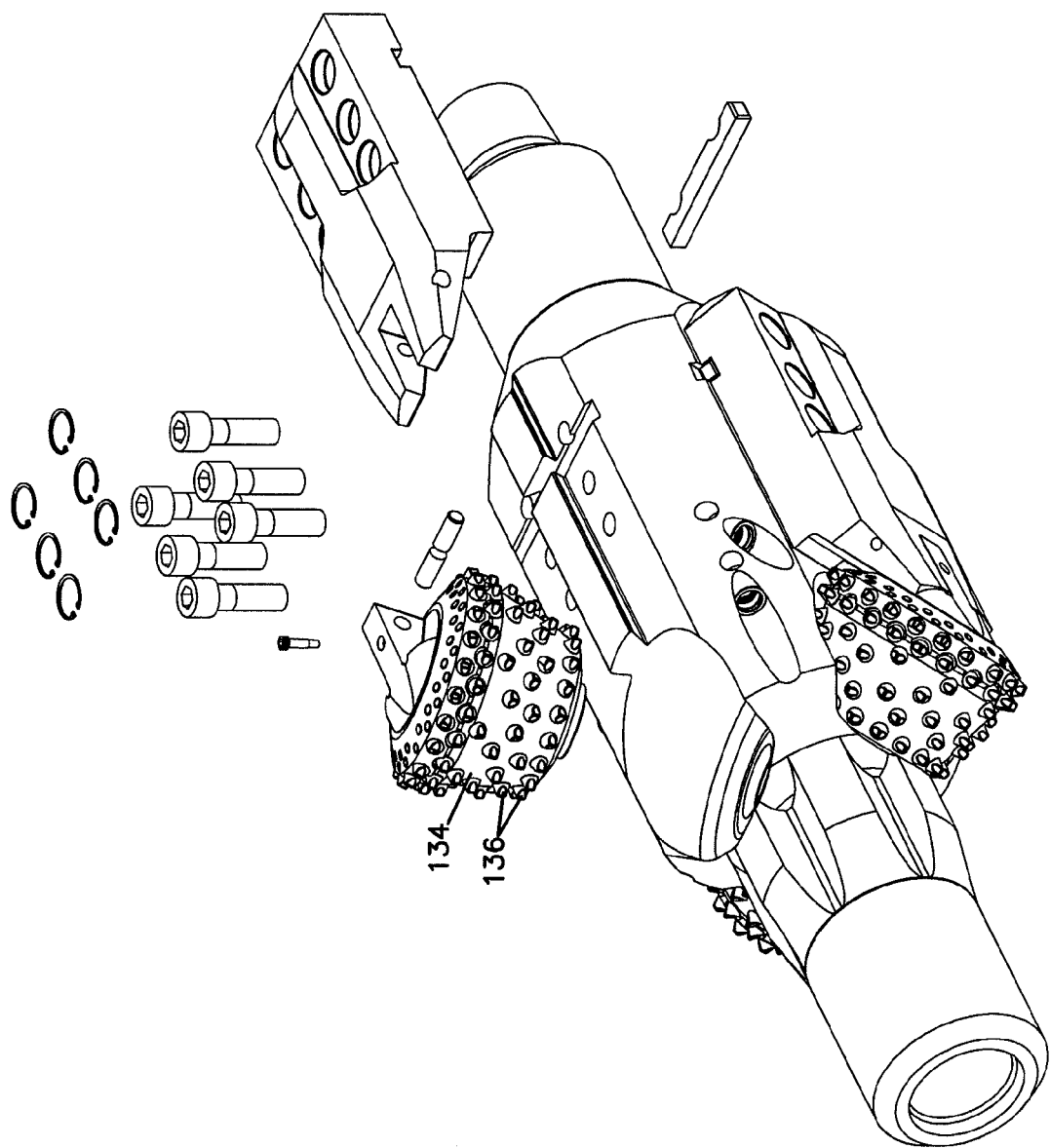
FIG. 4 is an exploded assembly view of a portion of the back reamer of FIG. 2.
Figure 5:
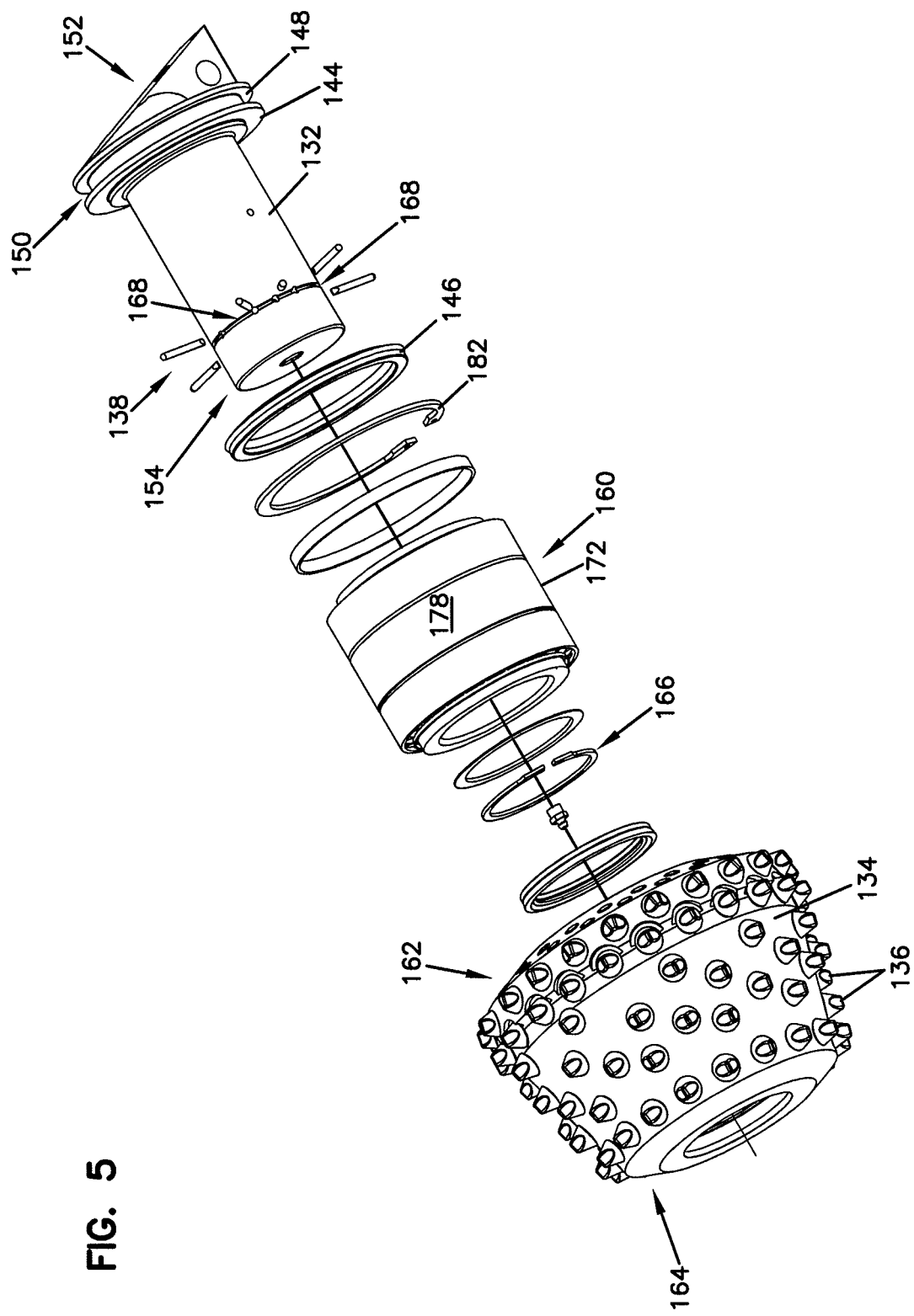
FIG. 5 is an exploded assembly view of the roller cone of the back reamer of FIG. 2.
Figure 7:
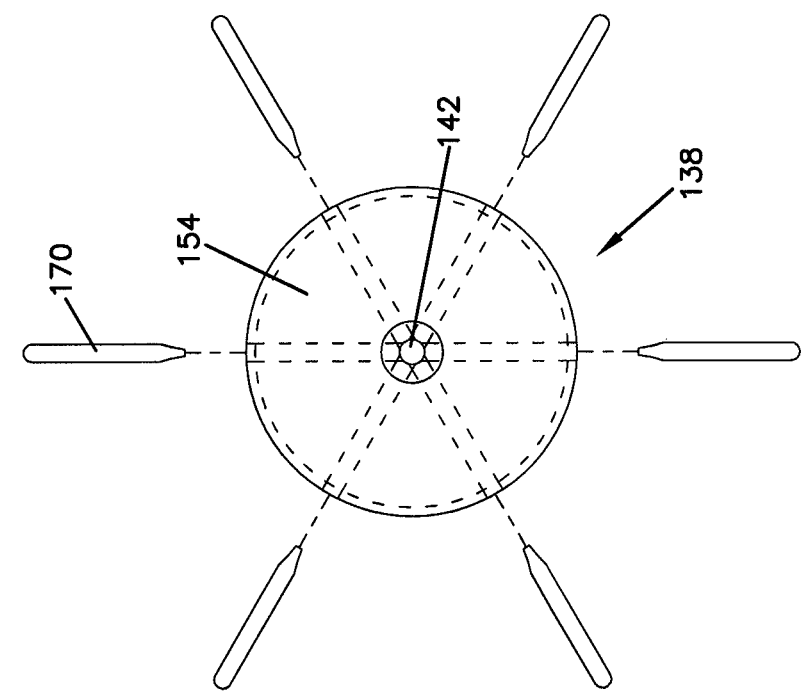
FIG. 7 is a partial end view of the shaft of the roller cone of FIG. 2.
Figure 6:
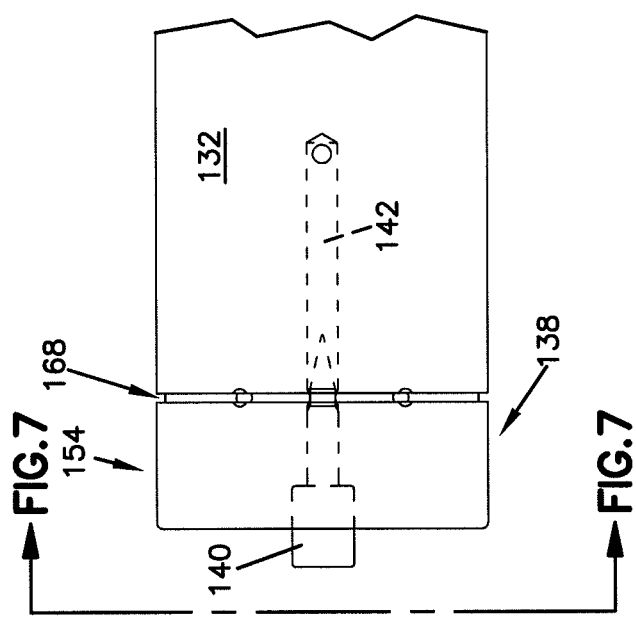
FIG. 6 is a partial side view of the shaft of the roller cone of FIG. 2.
Figure 8:
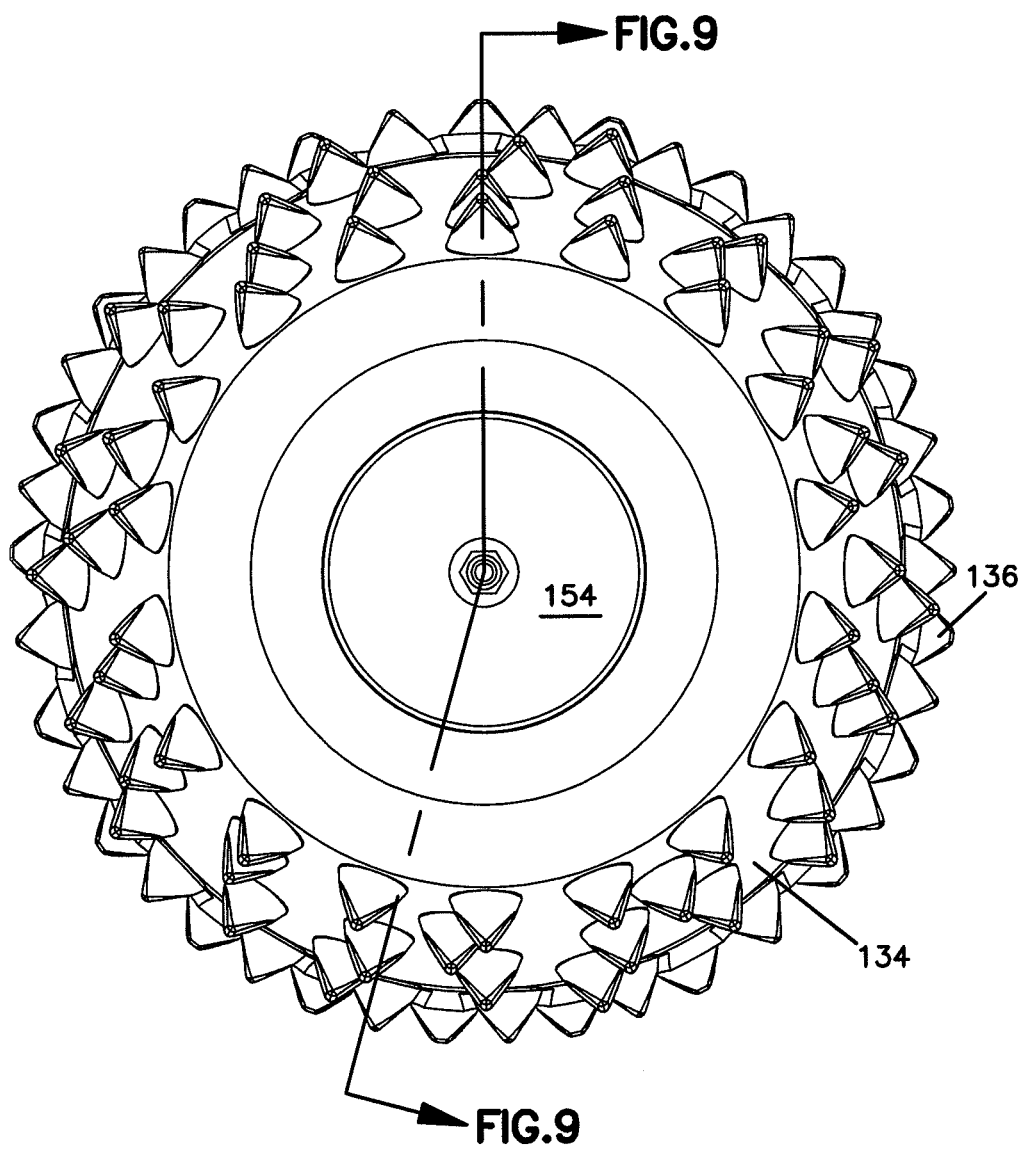
FIG. 8 is an end view of a roller cone of the back reamer of FIG. 2.
Figure 9:
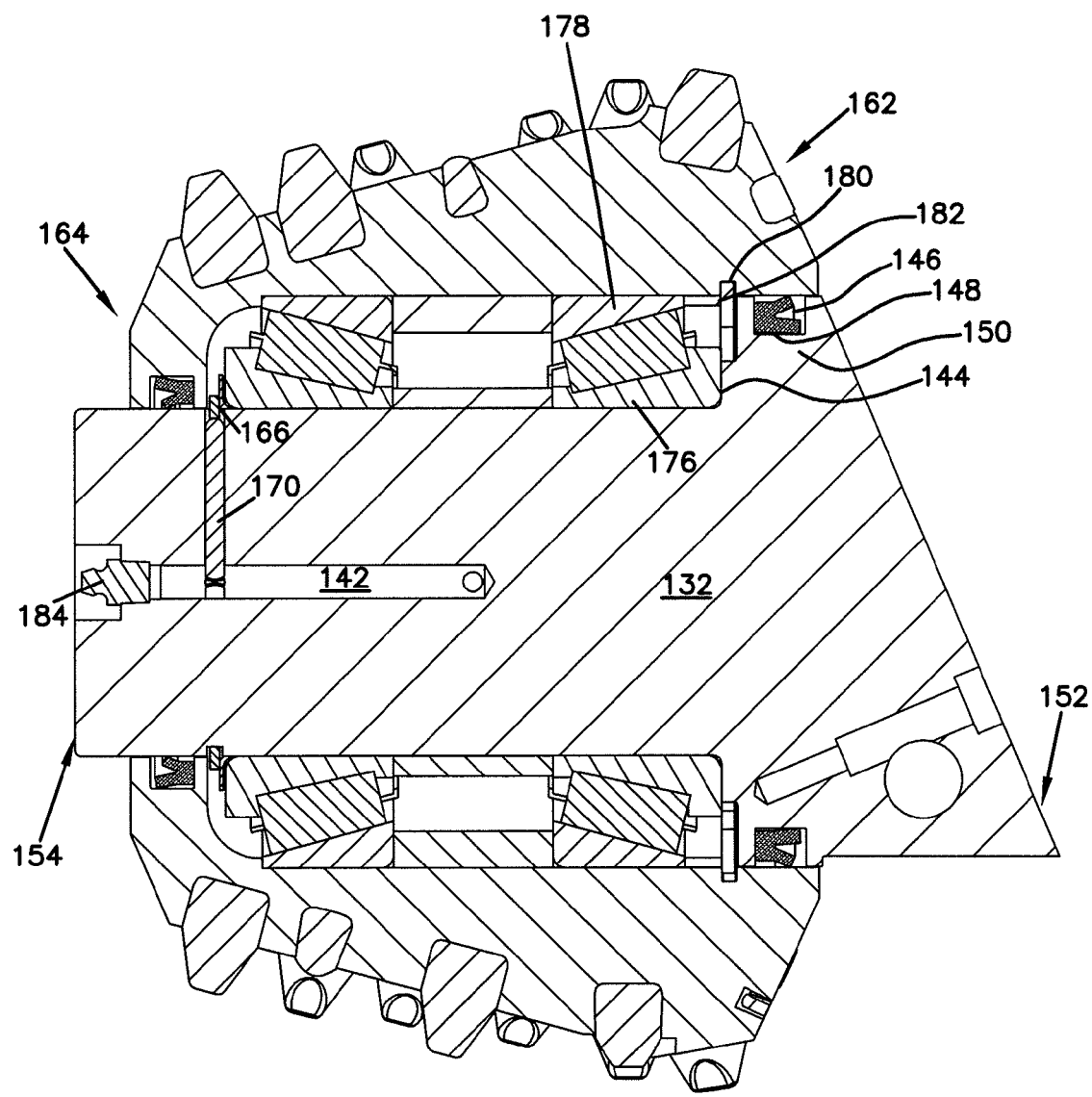
FIG. 9 is a cross-sectional view along lines 9-9 of FIG. 8.
Figure 10:
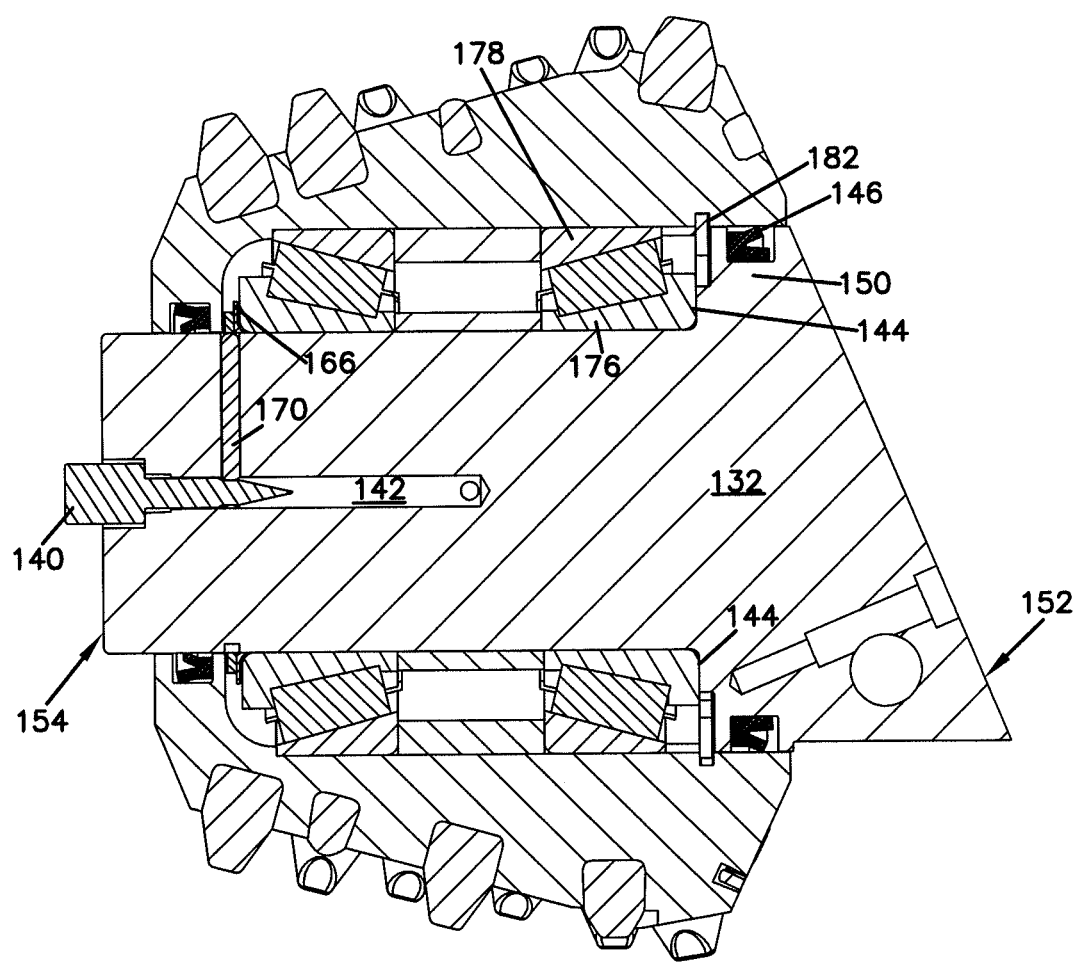
FIG. 10 is a cross-sectional view of the roller cone with the disengagement tool inserted into the disengagement aperture in the roller cone shaft.
Figure 11:
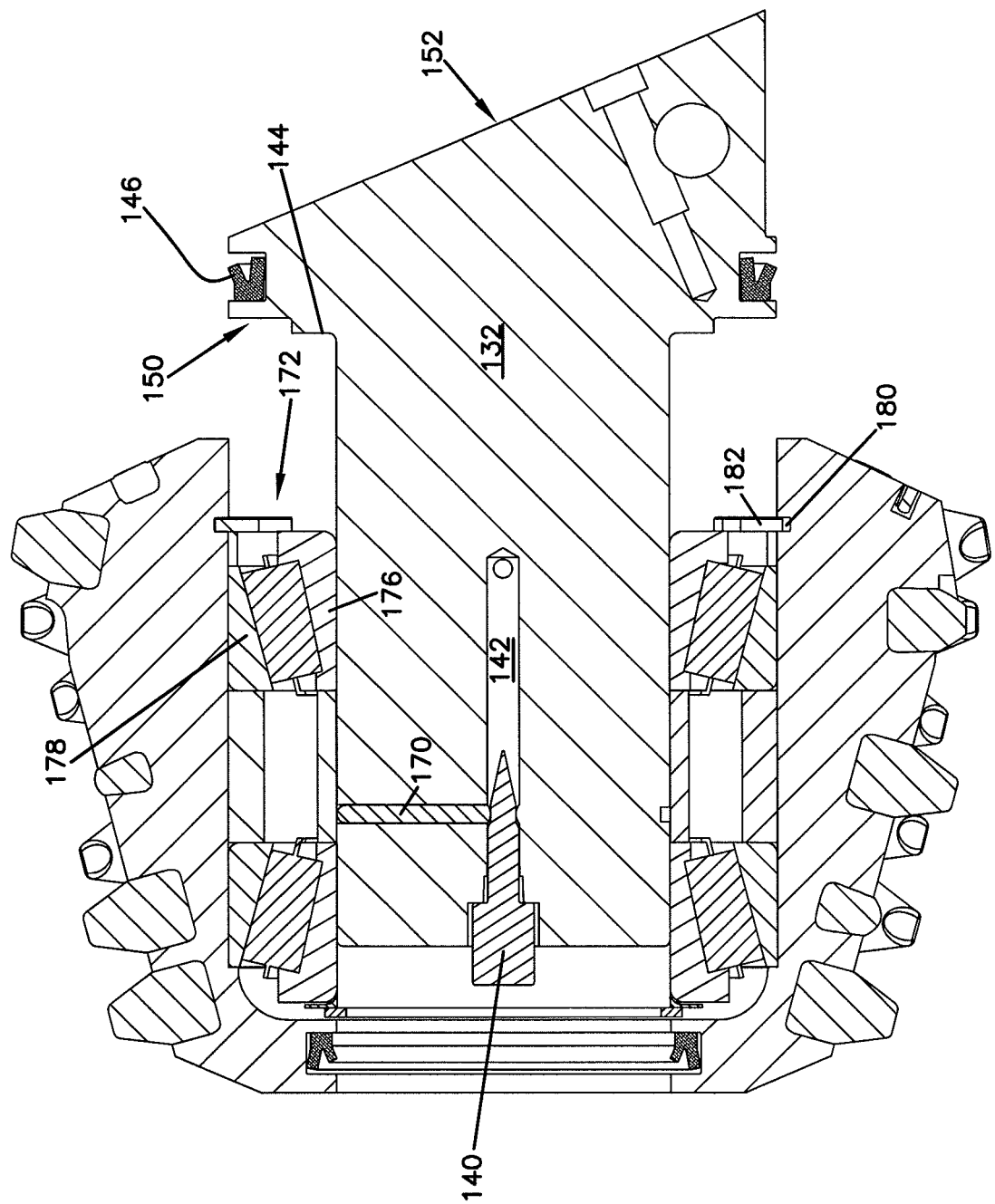
FIG. 11 is a cross-sectional view of the roller cone with the disengagement tool inserted into the disengagement aperture in the roller cone shaft and the shaft partially extending out of the roller cone body.
Figure 12:
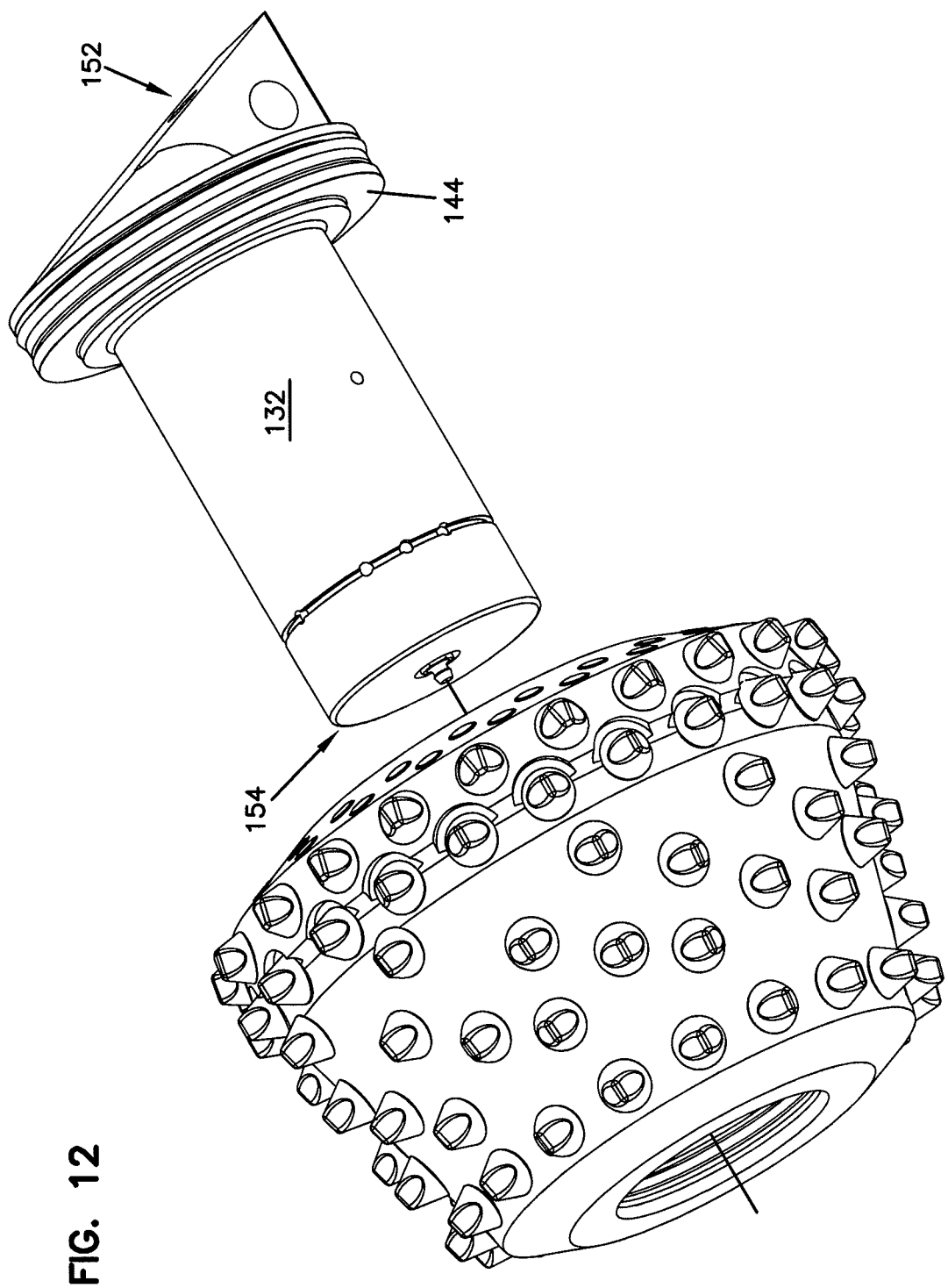
FIG. 12 is a partially assembled view of FIG. 5.

FIG. 1 illustrates an example horizontal drilling system in which reamers in accordance with the principles of the present disclosure may be used. The horizontal drilling system includes a drilling machine 100 depicted as a track-type vehicle. The drilling machine 100 includes anchors (e.g., augers) for securing the machine to a ground surface 102. The drilling machine 100 also preferably includes a thrust mechanism for pushing a drill string 108 into the ground to form a pilot bore, and for withdrawing the drill string from the ground. The horizontal drilling machine 100 further preferably includes a rotational drive mechanism for rotating the drill string 108 as the drill string is thrust into the ground or removed from the ground. It will be appreciated that the thrust mechanism of the horizontal drilling machine 100 can be oriented at an angle relative to the ground surface 102 to facilitate driving the drill string into the ground at a desired angle.

In use, the horizontal drilling machine 100 is used to drive the drill string 108 into the ground 102 as shown in FIG. 1. The far end of the drill string 108 is typically equipped with a cutting tool for cutting the pilot bore. To lengthen the pilot bore, pipes are sequentially added to the drill string until the drill string 108 extends from an entry point 104 adjacent to the drilling machine 100 to an exit point 106. Thus, the drill string 108 is formed by a plurality of drill rods connected together. By rotating the drill string 108 while concurrently applying thrust to the drill string, the cutting tool at the end of the drill string cuts the pilot bore.

After the drill string 108 has been pushed from the entry point 104 to the exit point 106, the cutting tool is removed from the far end of the drill string and replaced with a back reamer 119. A utility 110 (i.e., a utility pipe) can be attached to the back reamer 119 with a swivel 112 such that the drill string 108 can rotate independent of the utility 110. Once the back reamer 119 and the utility 110 have been attached to the drill string 108, the horizontal drilling machine 100 is used to withdraw the drill string 108. As the drill string 108 is withdrawn, the drill string 108 is rotated causing the back reamer 119 to enlarge the pilot bore. As the drill string is withdrawn, the utility 110 is concurrently pulled into the back reamed bore. As shown in FIG. 1, the back reamer 119 has been pulled about halfway back through the pilot bore, and the utility 110 has been installed along about half of the bore path.

Referring generally to FIGS. 2-14 the back reamer 119 is described in greater detail. In the depicted embodiment the back reamer 119 includes a tool body 120 including a first end 122 configured to be connected to a drill string 108 and a second end 124 configured to be connected to a utility 110. The back reamer includes a plurality of roller cones 126, 128, 130 (e.g., three roller cones) connected to a tool body 120 via roller cone shafts 132. In the depicted embodiment, the roller cones 126, 128, 130 are interchangeable and share the same features. Therefore, only one of the roller cones will be described in further detail below.

The depicted roller cone 128 includes an outer surface 134 including a plurality of cutter teeth 136 (e.g., carbide buttons) thereon. During use the roller cone 128 freely rotates about the shaft 132. In the depicted embodiment, the roller cone 128 includes a major diameter end 162 and a minor diameter end 164 and a central cavity 172 therebetween. In the depicted embodiment the roller cone shaft 132 includes a first end 152 configured to be arranged adjacent the major diameter end 162 of the roller cone 128 and a second end 154 configured to be arranged adjacent the minor diameter end 164 of the roller cone 128.

The first end 152 of the shaft 132 includes an annular shoulder 150 that is configured to cap and seal an aperture in the roller cone that receives the roller cone shaft. In the depicted embodiment the shoulder 150 includes a front surface 144 that engages a bearing assembly 160 and an annular groove 148 that retains a sealing ring 146.

The second end 154 of the shaft includes a lock assembly 138 configured to retain the roller cone shaft 132 in the roller cone. In the depicted embodiment the lock assembly 138 is configured to be unlocked by inserting a lock release tool 140 into an aperture 142 located on an end of the roller cone shaft 132, which extends outside of the minor diameter end 164 of the roller cone 128. In the depicted embodiment the aperture 142 is axially aligned and centered in the roller cone shaft 132 and serves as a grease conduit to central cavity 172 of the roller cone 128. In the depicted embodiment, the lock assembly 138 includes a snap ring 166 that engages an annular groove 168 on the roller cone shaft 132. In the depicted embodiment the lock assembly 138 includes a plurality of pins 170 (e.g., six pins) that extend from the annular groove 168 radially into the roller cone shaft and are configured to expand the snap ring 166 when the lock release tool 140 is inserted in the aperture 142. It should be appreciated that many other lock assembly configurations are possible, including, for example, embodiments that do not include pins or include different configurations of pins (e.g., three pins instead of six pins).

In the depicted embodiment, the bearing assembly 160 includes a bearing unit 174 that includes a plurality of bearings between internal bearing race ring 176 and external bearing race ring 178. In the depicted embodiment the internal bearing race ring 176 is press fit onto the external surface of the shaft 132. The snap ring 166 is configured to retain the shaft 132 relative to the bearing unit 174. In the depicted embodiment, a second snap ring 182 engages a groove 180 on the central cavity 172 at the major diameter end 162 the roller cone 128. The second snap ring 182 is configured to retain the bearing unit 174 in the roller cone 128.

Referring to FIGS. 9-12, the method of disassembling the roller cone 128 to replace the internal bearing unit 174 and seals is described in further detail. In the depicted embodiment the method includes the step of releasing the lock assembly 138 and biasing (pushing or pulling) the shaft 132 out of the roller cone 128. The step of releasing the locking assembly includes the step of removing a grease cap 184 located at the end of the roller cone shaft 132 and plunging a tapered distal end of the lock release tool 140 in an axial direction into the aperture 142 thereby forcing the pins 170 to move radially outward and expand the snap ring 166 such that it disengages from the groove 168. With the lock release tool in place, the shaft 132 can be pulled or pushed out of the roller cone 128. The force necessary to bias the shaft 132 out of the roller cone 128 once the snap ring 166 is disengaged is the lesser of the force needed to overcome frictional engagement between the inner race ring 176 of the bearing unit 174 or the retention force of the second snap ring 182. In other words, either the shaft 132 will slide out of the bearing unit 174 or the snap ring 182 will fail and the bearing unit 174 will exit the roller cone 128 with the shaft 132. In either case the bearing unit 174 can be accessed and repaired or replaced with a new or a rebuilt bearing unit.

Figure 13:
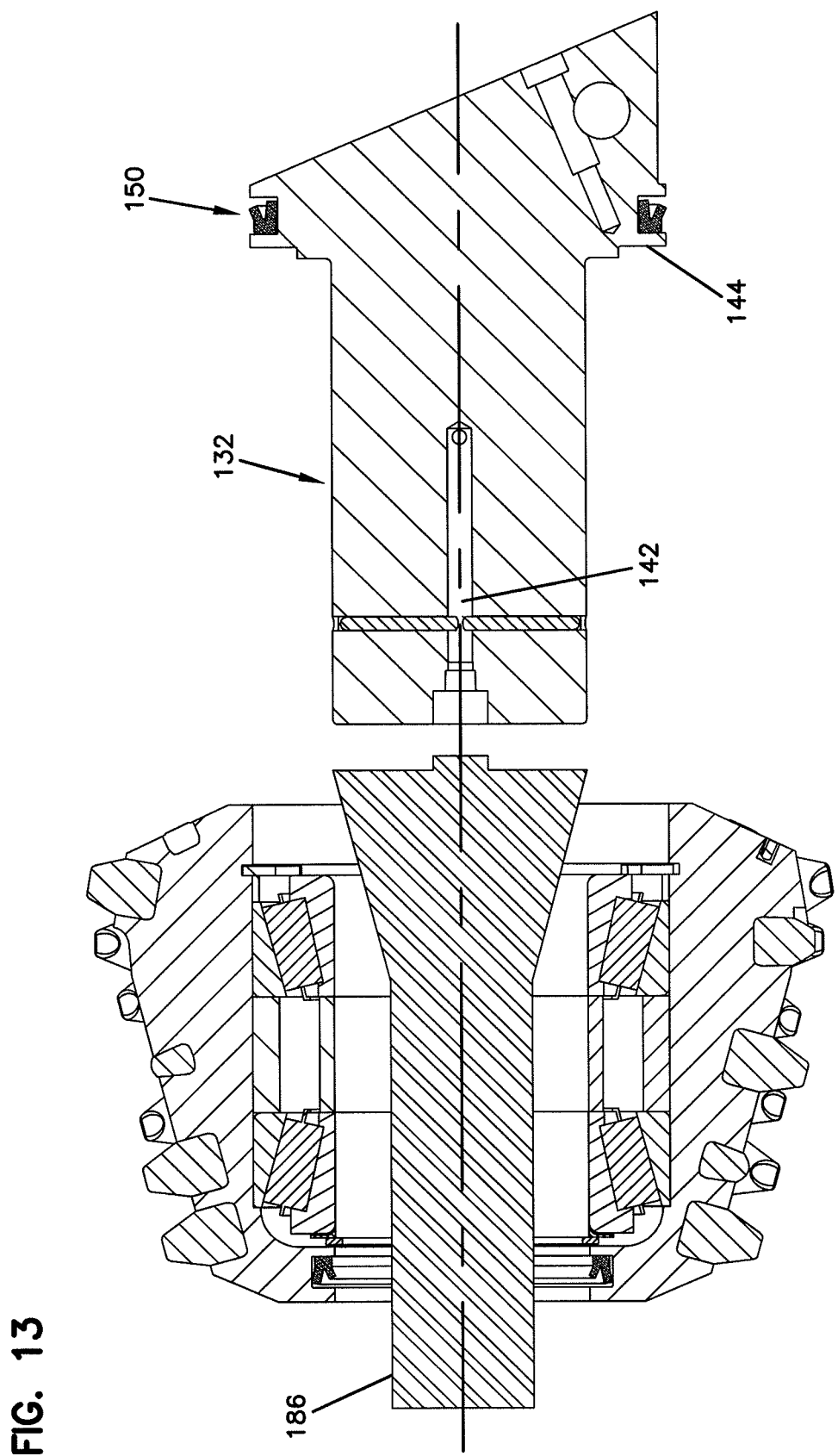
FIG. 13 is a cross-sectional view of a step in the assembly of the roller cone of FIG. 5.
Figure 14:
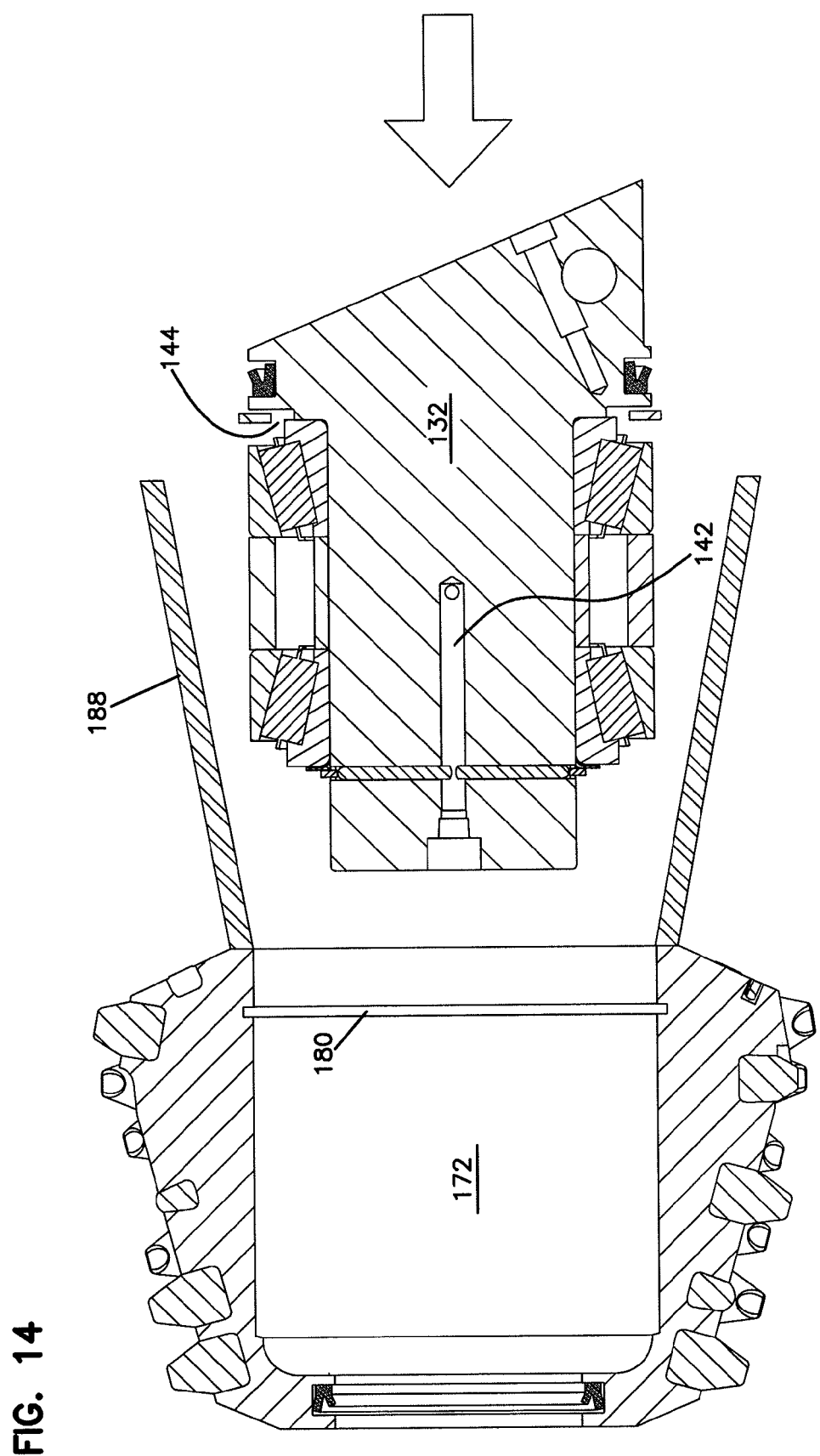
FIG. 14 is a cross-sectional view of an alternative step in the assembly of the roller cone of FIG. 5.

Referring to FIGS. 13 and 14, two alternative ways to assemble the roller cone 128 are shown. FIG. 13 illustrates a method wherein the bearing unit 174 is first inserted into the roller cone 128. A tapered snap ring expander tool 186 is inserted into the roller cone 128 before the shaft 132. The tapered lead-in tool 186 expands the snap ring 166 as the shaft 132 is pressed into position in the roller cone 128. Once the assembly is complete (i.e., the snap ring 166 engages the groove 168 on the shaft 132), the tapered lead-in tool 186 is forced out of the minor diameter end 164 of the roller cone. FIG. 14 illustrates an alternative assembly method wherein the bearing unit 174 is first connected to the shaft 132. In the depicted embodiment the bearing unit 174 is press fit onto the shaft 132 and the snap ring 166 is provided in the groove 168 to secure the bearing unit 174 in the shaft. A funnel tool 188 is used to depress the second snap ring 182 located adjacent the shoulder 150 of the shaft 132 so that it can move into engagement with an annular groove 180 in the central cavity 172 of roller cone 128.

Figure 15:
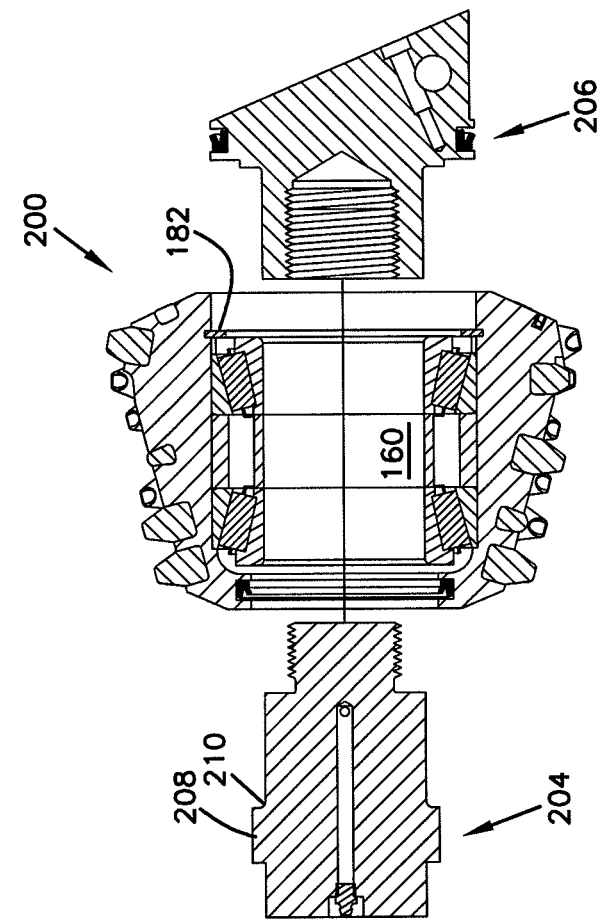
FIG. 15 is a cross-sectional view of an alternative embodiment of the roller cone of FIG. 10 in an assembled configuration.
Figure 16:
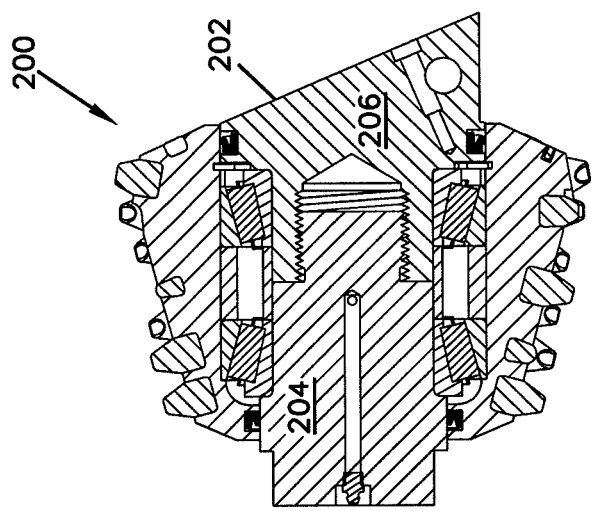
FIG. 16 is a cross-sectional view of the roller cone of FIG. 15 with the roller cone shaft disassembled.

Referring to FIGS. 14 and 15, an alternative embodiment of the roller cone is shown. Roller cone 200 has similar structural components as roller cone 128. The primary difference between roller cone embodiments relate to the shaft configurations. The shaft 202 of roller cone 200 includes a first part 206 that is separable from a second part 206. In the depicted embodiment the second part 204 includes a threaded boss that is configured to be threaded into a threaded aperture in the first part 206. Apart from the threaded aperture, the first part 206 has similar features to the first end 152 of the shaft 132.

In the depicted embodiment, the second part 204 includes a shoulder 210 that retains and engages bearing assembly 160 and an enlarged diameter portion 208 adjacent the shoulder 210 that caps and seals the minor diameter end of the roller cone 200. In the depicted embodiment, the distal end of the second part has generally the same diameter as the diameter of the second end 154 of the shaft 132 so that the roller cones 200 and 128 are interchangeable.

The roller cone 200 does not include the same lock assembly 138 including a snap ring 166 that is described above. The locking assembly of the roller cone 200 is the threaded arrangement between the two parts of the shaft 202. The roller cone can be disassembled by unthreading the shaft 202 and pulling the shafts out of the roller cone body exposing snap ring 182. Removing snap ring 182 allows the bearing assembly to be removed from the roller cone body.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A roller cone for a back reamer comprising:
   a roller cone body including an outer surface including a plurality of cutter teeth thereon, a minor diameter end, a major diameter end, and a central cavity;
   a shaft that extends into the central cavity of the roller cone body, the shaft including an annular shoulder that caps the major diameter end of the roller cone body;
   a bearing assembly positioned between the central portion of the roller cone body and the shaft, the bearing assembly configured to enable the roller cone body to rotate freely about the shaft; and
   a lock assembly configured to retain the shaft in the central cavity of the roller cone body, the lock assembly including a snap ring that engages an annular groove in the shaft, at least three pins that extend from the annular groove radially into the shaft to a release aperture, wherein the release aperture is configured to receive a tool configured to drive the pins radially outward thereby disengaging the snap ring from the annular groove in the shaft.

2. The roller cone of claim 1, wherein the shaft extends through both the major diameter end and minor diameter end of the roller cone body.

3. The roller cone of claim 1, wherein the annular shoulder of the shaft is configured to seal the major diameter end of the roller cone body.

4. The roller cone of claim 1, wherein the tool including a distal end that is configured to be inserted into the release aperture to drive the pins radially outward.

5. The roller cone of claim 1, wherein the release aperture provides a conduit for delivering grease into the central cavity.

6. The roller cone of claim 1, wherein the snap ring engages the annular groove and abuts the bearing assembly, thereby retaining the bearing assembly on the shaft.

7. The roller cone of claim 1, further comprising a second snap ring adjacent the annular shoulder of the shaft that engages an annular groove in the central cavity and retains the bearing assembly within the central cavity.

8. A back reamer comprising:
   a tool body including a first end configured to be connected to a drill string and a second end configured to be connected to a utility;
   at least three roller cones connected to a tool body via roller cone shafts, each roller cone including an outer surface including a plurality of cutter teeth thereon; and
   wherein each roller cone includes a lock assembly configured to retain each of the roller cone shafts in the roller cones, wherein the lock assembly is configured to be unlocked by inserting a lock release tool into an aperture located on an end of the roller cone shafts; and
   wherein the lock assemblies include a snap ring that engages an annular groove in the roller cone shaft, at least three pins that extend from the annular groove radially into the roller cone shaft and are configured to expand the snap ring when the lock release tool is inserted in an axial direction into the aperture located at the end of the roller cone shafts.

9. The back reamer of claim 8, wherein each roller cone shaft includes an annular shoulder that is configured to cap and seal an aperture in the roller cone that receives the roller cone shaft.

10. The back reamer of claim 8, further comprising a bearing assembly that includes bearing races that are press fit to the shaft.

11. A method of replacing bearings in a cutter for a back reamer comprising:
    disengaging a roller cone having cutter teeth thereon from a roller cone shaft by releasing a lock assembly,
    wherein the step of releasing the lock assembly includes inserting a release tool into an end of the roller cone shaft and biasing the shaft out from the roller cone; and
    wherein the step of inserting the release tool into the end of the roller cone expands a snap ring that is configured to retain the roller cone shaft in the roller cone.

12. The method of claim 11, wherein the step of releasing the lock assembly includes removing a grease cap located at the end of the roller cone shaft.

13. The method of claim 11, wherein the release tool is a rod with a tapered distal end.

14. The method of claim 11, wherein the roller cone shaft includes a first end and a second end, wherein the first end includes an annular shoulder that seals the end of the roller cone and the second end includes an aperture configured to receive the release tool.

15. The method of claim 11, further comprising press fitting a new bearing assembly on the roller cone shaft.

16. The method of claim 15, further comprising sliding the roller cone shaft with the new bearing assembly into the roller cone using a funnel to depress a snap ring adjacent the shoulder of the shaft that is configured to engage an annular groove in the roller cone to retain the new bearing assembly within the roller cone.

17. The method of claim 11, further comprising press fitting a new bearing assembly into the roller cone.

18. The method of claim 17, further comprising pushing the roller cone shaft into the new bearing assembly that is housed within the roller cone using a tapered lead-in tool to expand a snap ring that is configured to engage an annular groove on the roller cone shaft to retain the roller cone shaft to the bearing assembly.

19. A method of replacing bearings in a cutter for a back reamer comprising:
    disengaging a roller cone having cutter teeth thereon from a roller cone shaft by releasing a lock assembly, wherein the step of releasing the lock assembly includes inserting a release tool into an end of the roller cone shaft and biasing the shaft out from the roller cone; and wherein the roller cone shaft includes a first end and a second end, wherein the first end includes an annular shoulder that seals the end of the roller cone and the second end includes an aperture configured to receive the release tool.

\* \* \* \* \*